Dec. 10, 1957  O. H. JORGENSEN  2,815,670
STEPLESS VARIABLE-SPEED POWER-TRANSMISSION DEVICE
Filed Aug. 2, 1955  3 Sheets-Sheet 1

INVENTOR,
OSCAR HALFDAN
JORGENSEN
by Mead, Browne, Schuyler & Beveridge,
ATTORNEYS

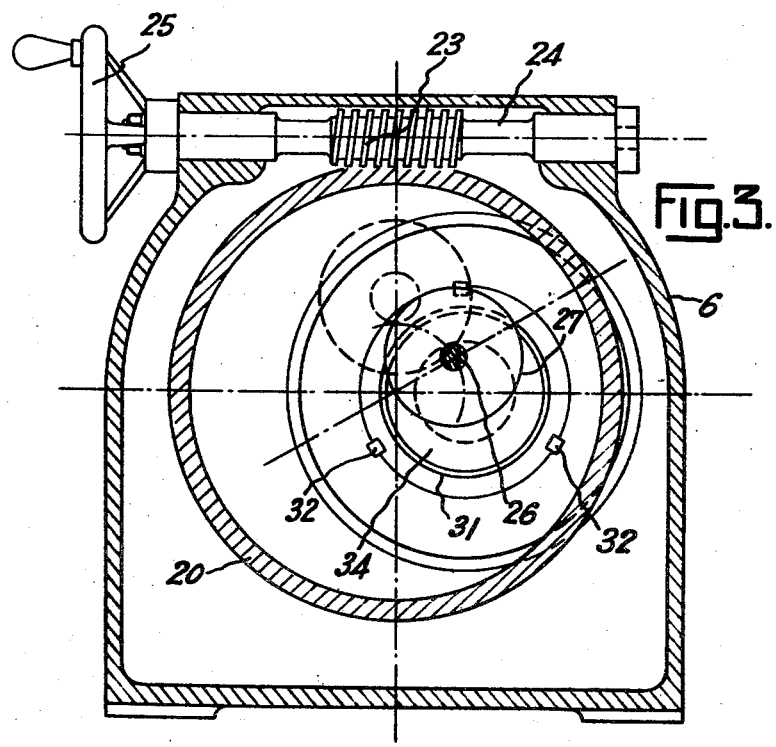
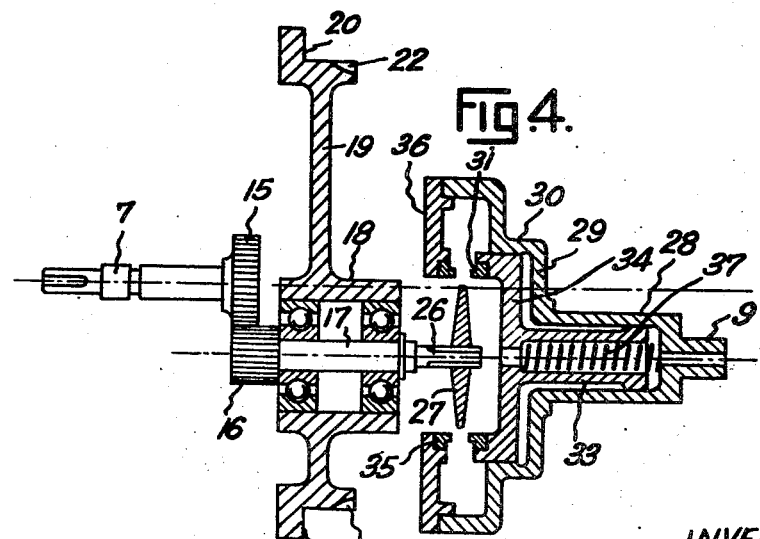

United States Patent Office 2,815,670
Patented Dec. 10, 1957

2,815,670

STEPLESS VARIABLE-SPEED POWER-TRANSMISSION DEVICE

Oscar Halfdan Jorgensen, St. Ives, New South Wales, Australia

Application August 2, 1955, Serial No. 525,937

Claims priority, application Australia August 10, 1954

6 Claims. (Cl. 74—199)

This invention relates to stepless variable-speed power-transmission devices of the kind comprising a driving shaft, a driven shaft, an annular frictional transmission element drive connected to one of the shafts, and a co-acting circular transmission element which is disposed inside the annular element and is in frictional contact therewith being variably interpenetrative relative thereto for the purpose of varying the gear ratio between the driving and driven shafts. An example of the class of mechanism to which the present invention belongs is provided by the invention subject of United States Patent No. 1,823,226 (Abbott).

In the invention of the mentioned prior patent a driven or output shaft is provided which is rectilinearly translatable thus to vary the amount by which the coned discs penetrate between the annular elements. This arrangement is satisfactory where there is no objection to the output shaft being translatable, but in many cases, particularly where the unit is to be used for industrial purposes (as distinct from automotive vehicle purposes) it is essential for both the input and output shafts to rotate about fixed axes. It is thus an object of the present invention to provide a unit of the general kind exemplified in the above-mentioned United States patent to Abbott in which both the input and output shafts rotate about fixed axes.

In the drawings forming part of the specification of my prior Australian Patent No. 149,678 a stepless variable-speed power-transmission device is illustrated in which three groups of coned discs are provided. Such an arrangement is satisfactory inasmuch as the loadings applied to the annular rings are circumferentially balanced but such balance while essential in some cases, is obtained at the expense of considerable mechanical complexity. Clearly, an important simplicity of construction is obtainable by having only a single coned disc (or a single group of coaxial coned discs) as shown in the mentioned Abbott United States patent. The use of only a single coned disc (or coaxial group thereof) results in the presence of a point of drive transmission between the discs and the rings which is one-sided or out-of-balance when compared with transmission through a plurality of circularly equally spaced coned discs, or groups thereof, as exemplified by the mentioned prior Australian patent. This out-of-balance single point or line of drive transmission, by normal mechanical standards, would appear to be inept; but it is a characteristic of the present invention that this seeming mechanical ineptitude is compensated in such a manner as not to impair the mechanical efficiency of the unit as a whole or of any part thereof. It is thus a further object of the present invention to provide a device of the kind indicated, in which out-of-balance disc loadings applied to the annular rings is prevented from exerting any damaging effect on the device as a whole.

The present invention may be summarised as consisting in a stepless variable-speed power-transmission device of the kind comprising an input shaft, an output shaft, and driving and driven transmission elements respectively drive-connected to said shafts and respectively consisting of at least one coned disc and at least two annular rings having said disc drivingly engaged therebtween; characterised, in that both of said shafts are mounted about stationary axes; and, in that one of said elements is rotatable about a fixed axis, and the other of said elements is drive-connected to and is translatable planet-wise about that one of said shafts with which it is associated, by means comprising, a sun gear fixed on the associated shaft, a pinion which meshes said sun gear, a planet shaft whereon said pinion is fixed, a support plate wherein said planet shaft is eccentrically borne, and mechanism for rotating said support plate about the fixed axis of said associated shaft.

Two examples of the invention are shown in the drawings herewith. The drawings are to some extent schematic as certain lines not in the plane of the paper have been omitted for clearness.

Fig. 3 is a sectional end elevation taken on line 3—3 in Fig. 1.

Fig. 4 is a sectional detail taken on line 4—4 in Fig. 2.

Figure 1:
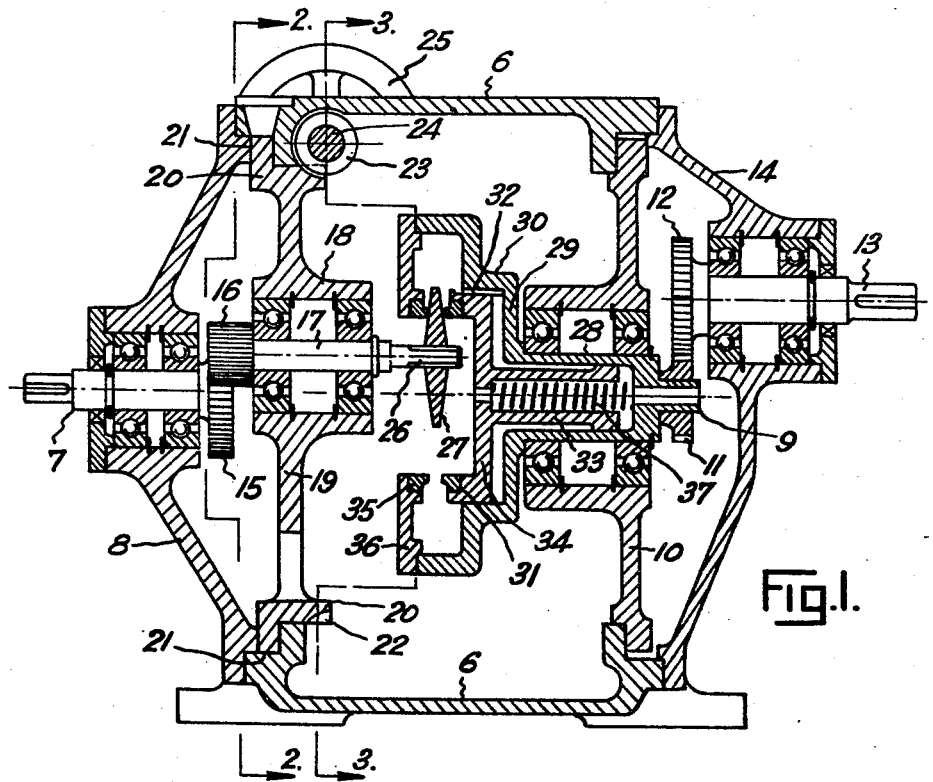
Fig. 1 is a sectional side elevation (taken on line 1—1 in Fig. 2) of one embodiment of the invention.
Figure 2:
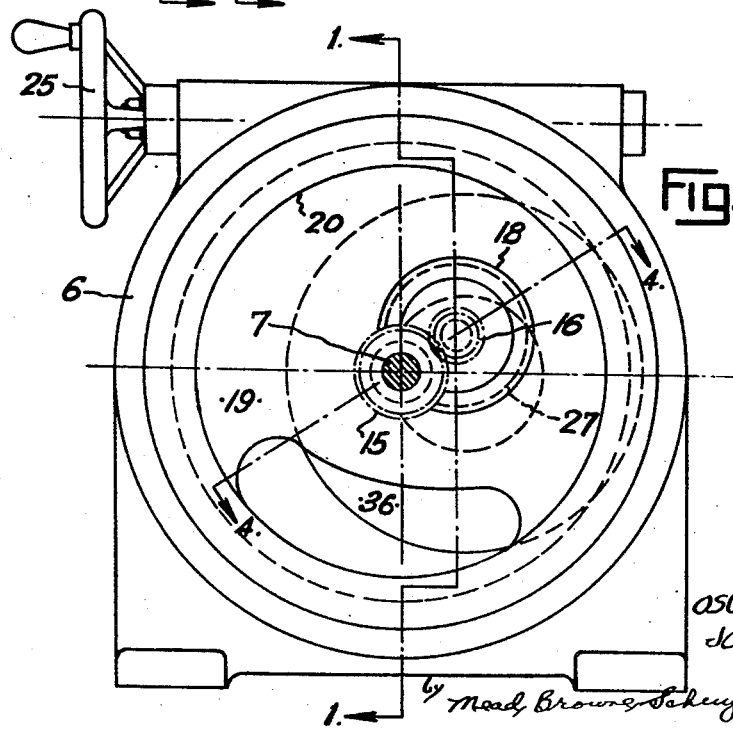
Fig. 2 is a sectional end elevation taken on line 2—2 in Fig. 1.

Referring to Figs. 1 to 4, the unit comprises an outer gear box or casing 6 of more or less conventional design. In one end of the casing an input shaft 7 is borne in stationary cover plate 8, and at the other end of the casing an output shaft 9 is borne in a second stationary cover plate 10. If the output shaft is required to be associated with a reduction gear or the like, such may be provided substantially in accordance with known practice. In the illustrated arrangement under consideration a reduction gear is provided. It consists of gear pinion 11 keyed on the output shaft and a gear wheel 12 on shaft 13 borne in extra cover plate 14.

The input shaft 7 has sun-wheel 15 keyed or otherwise fixed thereon. The sun-wheel is meshed by a pinion 16 fixed on planet shaft 17. This planet shaft is freely rotatable in a bearing sleeve 18 disposed eccentrically on a support plate 19. The plate 19 has a circumferential journal flange 20 whereby the plate is rotatable within a bearing ring 21 formed by the casing 6 and the cover plate 8. The bearing ring 21 is concentric with the shaft 7, and the eccentricity of the sleeve 18 is such that upon rotation of plate 19 the pinion 16 remains in mesh with the sun-wheel 15.

Means for rotating the support plate 19 may consist of worm teeth 22 formed on the flange 20 and meshed by worm pinion 23 on shaft 24 carrying hand-wheel 25.

The inner end 26 of the planet shaft is splined and carries on it a coned disc 27 which constitutes one of the transmission elements previously referred to herein. The splined mounting of disc 27 enables the disc to move longitudinally of the planet shaft while being compelled to rotate therewith.

The output shaft 9 includes a tubular shank portion 28 which carries a flange 29. This flange at its periphery has a short but relatively large diameter cylindrical sleeve 30. The output shaft thus has two internal bore portions of considerably different diameter; namely, the interior of the shank portion 28 and the interior surface of the sleeve 30. These two surfaces constitute a bearing for a first driven ring 31 which is endwisely slidable but non-rotatable within the tubular output shaft by reason of keys 32. The first driven ring, because of its bearing against the two different diameter portions of the output shaft, similarly consists of a shank portion 33 having a flange 34 on the gear box interior end thereof, this flange peripherally terminating in an annular driving surface. A companion annular driving surface is provided by a second ring 35 which has a driving face adjacent that of the first ring, this second ring having a peripheral extension 36 or an edge flange whereby it is directly bolted or otherwise affixed to the sleeve 30 forming part of the output shaft. The bearing faces of the two annular rings may be furnished with driving beads, peripheral lands, or the like, for accommodation therebetween of the coned disc 27.

Spring-loading means are provided which influence the two rings 31 and 35 for mutual approach of their driving faces. In a preferred embodiment these loading means consist of a compression spring 37 housed in a counterbore within the shank of the first driven ring, the spring seating against a counterbore floor in the first ring shank and against a similar counterbore in the output shaft shank.

Figure 5:
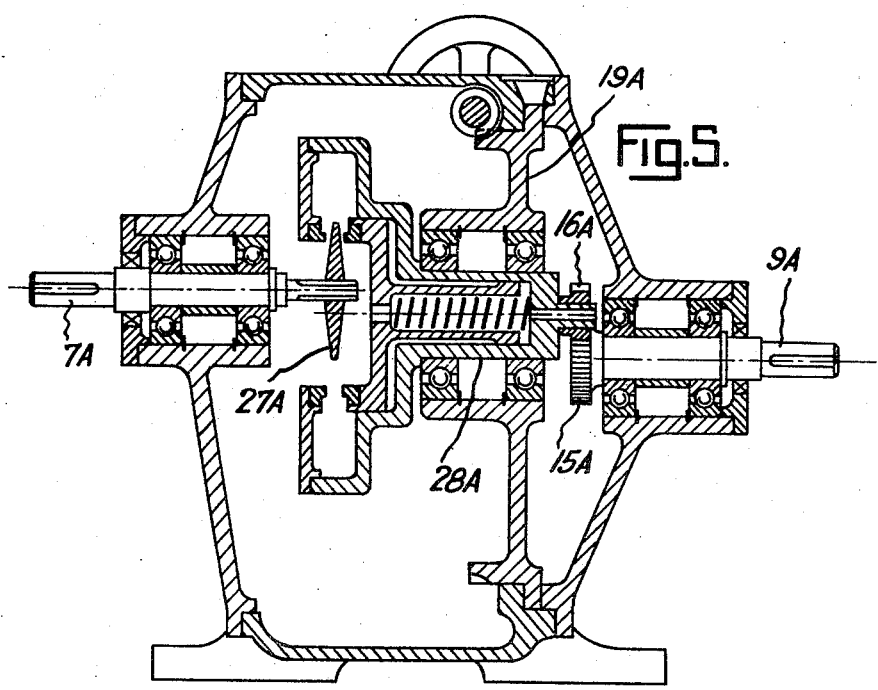
Fig. 5 is a similar view to Fig. 1 showing a modified embodiment of the invention.

The embodiment shown in Figure 5 is substantially the same as that shown in Figs. 1 to 4, except that in this case it is the annular ring assembly which is translatable in planetary fashion instead of the coned disc assembly.

In this embodiment the coned disc 27A is rotatable about a fixed axis; namely, that of the input shaft 7A upon which the disc is splinedly mounted. The shank 28A is a planet shaft which carries a planet pinion 16A meshing a sun-wheel 15A keyed on the output shaft 9A.

The shank 28A is eccentrically borne in a support plate 19A which is mounted and operable as previously explained with reference to support plate 19.

It will be understood that although the illustrated embodiments of the invention are preferred forms in which there is only one coned disc and only two annular rings embracing the coned disc; the number of coned discs may be greater than one provided they are mounted as a co-axial group on the splined shaft which carries them and provided the number of annular rings is correspondingly increased.

I claim:

1. A stepless variable-speed power-transmission device of the kind comprising a box-like casing, an input shaft, an output shaft in bearings supported by said casing, and driving and driven transmission elements housed in said casing and respectively drive-connected to said shafts and respectively consisting of at least one coned disc and at least two annular rings having said disc drivingly engaged therebetween; one of said elements being coaxial and rotatable with one of said shafts, and the other of said elements being driven-connected to, and translatable planet-wise about, that one of said shafts with which it is associated, by means comprising a sun gear fixed on the associated shaft, a pinion which meshes with said sun gear, a planet shaft on one end of which said pinion is fixed and on the other end of which said other element is mounted, a circular support plate wherein said planet shaft is eccentrically borne, a journal ring constituting the periphery of said support plate, a bearing for said journal formed in said casing coaxially with said sun gear, and a mechanism for rotating said support plate and retaining it in selected rotational adjustment.

2. A device according to claim 1 wherein said mechanism for rotating said support plate comprises, worm teeth formed on the periphery of said plate, a worm pinion meshed with said teeth and means for manually rotating said worm pinion.

3. A device according to claim 1 wherein said annular ring element is mounted on said output shaft, and said coned disc element is mounted on said planet shaft.

4. A device according to claim 3 wherein said output shaft comprises a tubular shank and a larger diameter sleeve fixed on said shank, and said annular ring element includes a first driven ring which is borne inside said sleeve and a shank on said first driven ring which is borne inside said tubular shank.

5. A device according to claim 1 wherein said coned disc element is mounted on said input shaft, and said annular ring element is mounted on said planet shaft.

6. A device according to claim 5 wherein said planet shaft comprises a tubular shank and a larger diameter sleeve fixed on said shank, and said annular ring element includes a first driven ring which is borne inside said sleeve and a shank on said first driven ring which is borne inside said tubular shank.

References Cited in the file of this patent

UNITED STATES PATENTS 2,583,496  Rougelot _____ Jan. 22, 1952

FOREIGN PATENTS 243,659  Switzerland _____ July 31, 1946